United States Patent [19]
Schule

[11] 3,838,708
[45] Oct. 1, 1974

[54] IN-LINE CHECK VALVE

[76] Inventor: Albert Schule, Niklaus von der Fluhstrasse, Basel, Switzerland

[22] Filed: Aug. 14, 1973

[21] Appl. No.: 388,096

[30] Foreign Application Priority Data
Aug. 21, 1972 Switzerland.................. 12352/72

[52] U.S. Cl...... 137/516.11, 137/525.3, 251/DIG. 3
[51] Int. Cl............................................. F16k 15/14
[58] Field of Search....... 137/512.1, 512.15, 516.11, 137/525, 525.3, 525.5, 533.19, 543.19; 251/DIG. 3

[56] References Cited
UNITED STATES PATENTS
| | | | |
|---|---|---|---|
| 3,022,796 | 2/1962 | Cummings | 137/512.15 X |
| 3,448,766 | 6/1969 | Schule | 137/525 |

FOREIGN PATENTS OR APPLICATIONS
| | | | |
|---|---|---|---|
| 370,253 | 8/1963 | Switzerland | 137/512.15 |
| 564,936 | 7/1957 | Italy | 137/525 |

Primary Examiner—Robert G. Nilson
Attorney, Agent, or Firm—Flynn & Frishauf

[57] ABSTRACT

The check valve can be placed within a pipe and includes, essentially, a conical structure with openings therein, and a deformable, elastic member within the conical structure; flow from the tip of the cone towards the base is permitted, fluid passing through the apertures of the conical structure and deforming the elastic insert; flow in the other direction presses the conical structure against the openings. In accordance with the invention, the conical structure is formed of spirally wound wire, preferably round wire, held in position by longitudinal spacers at the surface of the cone, so that the aperture will be a spiral slit, the deformable insert pressing against the round wires when in check position, thus preventing damage to the deformable insert.

9 Claims, 4 Drawing Figures

IN-LINE CHECK VALVE

The present invention relates to an in-line check valve, and more particularly to the valve seat for such a check valve.

In-line check valves usually include a valve seat against which a deformable elastic insert can be pressed, when in counterflow condition, the deformable insert lifting off the valve seat for forward flow. Such check valves, in the past, have utilized valve seats made usually of sheet metal, shaped in a cone, for example by rolling, and welded along a generatrix of the cone, or pressed, or extruded. The valve seat is formed with a plurality of openings, through which the fluid, usually a liquid, can flow. If the valve seat is made of rolled sheet metal, then it is customary to punch the openings before forming the cone, or before welding. The punched-out metal no longer is used and is disposed of or sold as scrap. The punching operation is costly, and usually leaves burrs. Valve seats in which the openings are pre-formed, for example made of plastic, are suitable only for small valves, or low pressures.

The elastic insert which seals the openings in counterflow direction is usually made of rubber, or similar elastomer material. This elastic material is located within the conical insert and fits loosely against the inner wall thereof. Upon reverse flow, however, that is, when the check valve has to close, the reverse pressure of the fluid presses the elastic insert tightly against the seat. If the openings are punched, and if burrs are left, or even if the burrs are removed, the punched openings still leave sharp edges against which the elastic insert is pressed. If the reverse pressure is high, the elastic insert may be pressed at least partly into the openings themselves, the material surrounding the openings pressing then into the elastic insert and causing sharp corners to be formed at the edges of the openings. This may damage the material of the insert; in any event, the material of the insert is highly stressed at the edges. Such high stress may arise, due to the usually present turbulence of the flow caused by the insert at many different locations, and at locations which change as flow conditions change, so that the material of the insert is not only statically, but dynamically stressed. Rounding the edges of the openings would result in substantial costs which would make construction of such check valves uneconomical.

It is an object of the present invention to provide a check valve, and more particularly a valve seat for a check valve of the in-line type which is reliable in use, does not cause excessive stresses, and is easy and inexpensive to manufacture.

Subject Matter of the Present Invention

Briefly, the conical insert or structure is formed of spirally wound wire, at least a portion of the turns of the spirally wound wire being spaced from each other to form a spiral slit between the interior and exterior of the conical structure. The wire is preferably round. Spacer means are provided to secure the wire turns in relation to each other and in conical position, for example by other wires welded along generatrices of the cone. A deformable elastic insert is then placed within the cone, to fit within the conical structure. Upon reverse flow, the elastic insert will fit against the spiral turns, which, if the wire is round, present no sharp edges and sufficient bearing surface for the spiral insert. The spiral insert, at its tip end, may be left with an opening of sufficient turns to secure a screw therein, the screw being threaded right into the spiral turns, to hold the insert in position; alternatively, the insert can be formed with (or have attached thereto) an appended stem with an outer holding head or mushroom, permitting axial movement of the insert but holding it in position.

In a preferred form, the wire has circular cross section. Circular wires have the advantage that the flow thereover is uniform, and thus introduce less turbulence. A round body presents low flow resistance to a surrounding fluid. The sharp edges surrounding the openings are likewise avoided. If the elastic insert is pressed against the spiral windings due to back pressure, then it will fit about each wire by curving thereover. If the pressure increases, the area of contact of the elastic insert with the wire will increase, so that as the pressure increases, a countersurface of metal, which is non-yielding, of likewise increasing area is provided to support the back pressure on the elastic insert. Thus, increasing pressure is at least partly compensated by an increasing bearing surface. The specific loading on any unit area on the material of the insert thus does not increase linearly with pressure, but rather increases slower, due to the additional bearing surface being provided. The elimination of the sharp edges does not introduce localized peak loads in the elastic insert, which, as a whole, thus is loaded to a much lesser extent than heretofore.

The invention will be described by way of example with reference to the accompanying drawings, wherein.

Figure 1:
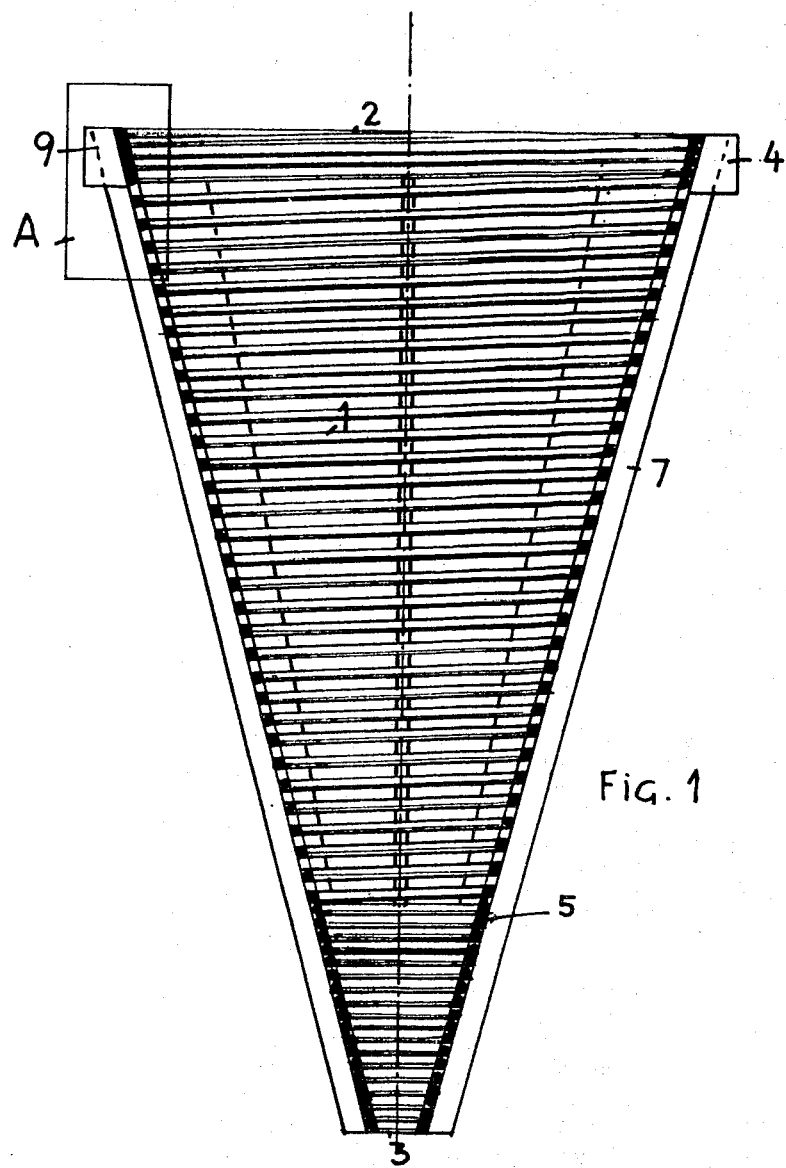
FIG. 1 is a longitudinal sectional view through a valve insert for a valve in accordance with the present invention.
Figure 2:
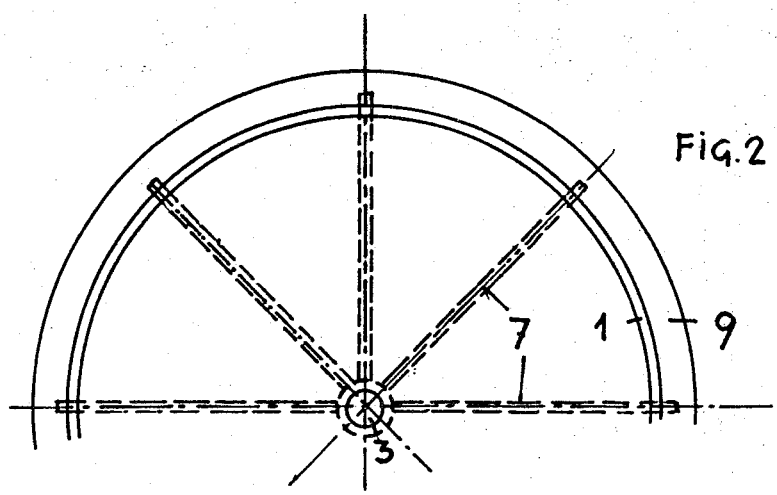
FIG. 2 is a top view of the valve insert.

The valve seat is formed of wire 1 of circular cross section, spirally wound with decreasing diameter to form a conical structure. A single wire, or a plurality of wires in the form of a multi-gang spiral may be used. As illustrated, a single wire spirals from the opening 2 to the tip 3 of the cone. The windings adjacent the opening 2 and adjacent the tip 3 are wound close to each other (see also FIG. 3). At the opening 2, and at the tip 3, therefore, a sealing surface 4 and a seat 5, respectively, for a resilient closing element 6 (FIG. 3) are formed thereby. The resilient closing element 6, made of elastomer material, can be held by means of a screw (not shown), which fits within the interior diameter of the tip 3 of the cone, and is secured in the insert in suitable and well known manner. The windings located between the sealing surface 4 and the seat 5 are sapced from each other. Fluid can flow through the space between the windings. The spacing itself can be selected in accordance with design requirements, depending on the wire to be used (its material, and diameter), the viscosity of the fluid, pressure, and the like, that is, can be readily matched to operating or material requirements and characteristics.

Spacers 7 are secured to the spiraled wire, the spacers preferably being longitudinally extending pins, straight wires, or rods, located along generatrices of the cone. If the valve is to be designed for low or medium loading only, the same wires as those used for the spiral wire may be used as combined stiffening and spacer elements. If higher loading is, however, anticipated or if the valve is to be designed for high back pressures, rods of, for example, rectangular cross section are preferred. The spacers 7 can be secured to the wire 1 by spot welding or other electric welding techniques. The spacers 7, besides maintaining the wire cone in its conical shape as the pressure increases, further maintains the wire turns in relative spaced relationship in the region between the sealing zone 4 and the tip 5.

Figure 3:
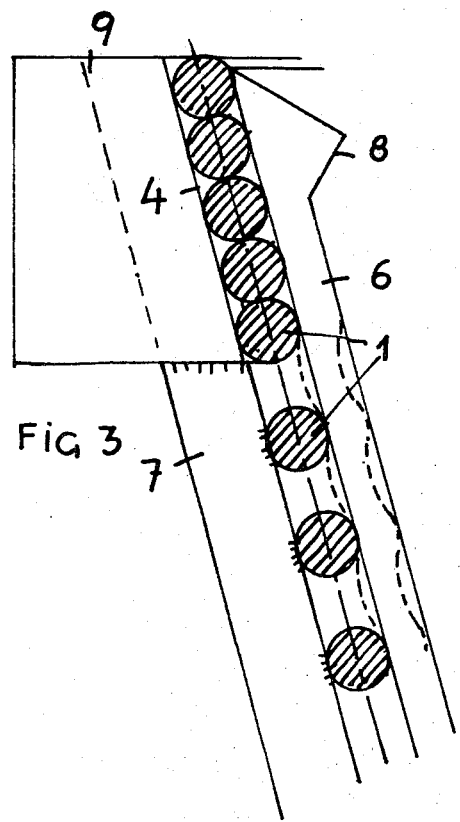
FIG. 3 is a detail view to a much enlarged scale, of the region enclosed within the square A of FIG. 1.

The sealing element 6, as seen in FIG. 3, may have a reinforced upper edge 8 adjacent the opening 2. A flange 9 can be secured to the valve seat 1 adjacent the opening 2, in order to permit ready insertion of the check valve into a pipeline.

The solid line in FIG. 3 illustrates the position of the elastic sealing element 6 in quiescent condition, that is, when no back pressure is applied and no forward pressure lifts the element off contact with the wires. The sealing element will deform in accordance with the dashed lines upon application of reverse pressure. It is readily apparent that the sealing element will fit around the rounded cross section of the wire, so that a portion of the circumference of the sealing element will deform and wrap against the circumference of the wires, being partly pressed within the space between the wires. The wires may have cross sections other than circular, for example elliptical, or as desired; sharp corners should, of course, be avoided.

Figure 4:
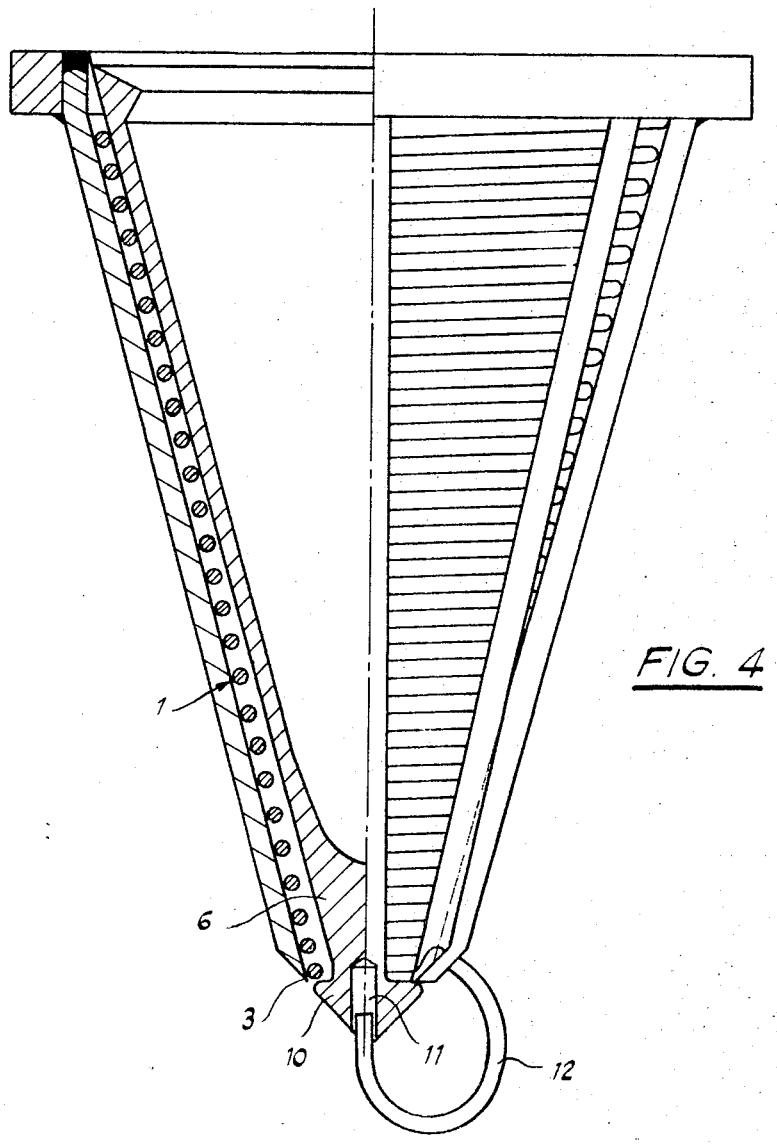
FIG. 4 is a longitudinal sectional view through a valve seat illustrating a modification of holding the insert element.

The conical tip 3 of the valve seat may be formed with an inner diameter which is larger than that required to hold an attachment screw. Referring to FIG. 4, the insert element 6 is then formed with an extending pin, or a mushroomed head 10, elastically pressed through the valve seat from the inside thereof. The head mushrooming out at the other side will then hold the valve seat in position. Larger valve seats are preferably so formed that an opening 11 is formed in the head 10, which facilitates insertion of the head. Thereafter, a suitable element, for example a circular wire 12, which could be secured with one end to the valve seat 1, then fills the space, thereby eliminating or greatly reducing the possibility that the closing element 6 can again escape from the valve tip 3.

The advantages of the valve seat are apparent: it can be manufactured simply, and by well known wire forming techniques, the material being used practically having no waste or scrap. The openings through which the fluid may flow are uniformly distributed over the surface of the valve seat and reach a high proportion of the overall valve surface (for example up to about 45 percent thereof), so that, in combination with the low flow resistance offered by rounded surfaces, the overall flow resistance offered by the valve as a whole is low.

Various changes and modifications may be made within the scope of the inventive concept.

In a typical valve, the following dimensions may apply:

diameter of the valve seat at opening 2: 200 mm (7⅞ inches)
length of the conical element between tip 3 and opening 2: 340 mm (13⅜ inches)
diameter of wire 1: 3 mm (⅛ inch)
pitch of wire: 6 mm (abt 15/64 inch)
a valve in accordance with the example would be suitable for a liquid essentially including water, oil, chemical liquids such as e.g. freon, gases, air, vacuum
at a forward pressure of 17 Kp/cm$^2$ (242 psi)
and a back pressure of 25 Kp/cm$^2$ (356 psi)
the elastic insert 6 within the valve seat was made of rubber

I claim:

1. In-line check valve for placement within a pipe comprising
    a conical structure formed of a spirally wound wire (1), at least a portion of the turns of the spirally wound wire being spaced from each other to form a spiral slit between the interior and exterior of the cone;
    spacer means (7) securing the spiral turns of the wire in relation to each other and in conical position;
    and a deformable elastic insert (6) having outer conical walls fitting within the conical structure, the deformable insert seating against the spirally wound wire structure when reverse flow is encountered, and lifting off the spiral wire structure upon forward flow.

2. Valve according to claim 1 wherein the wire has circular diameter.

3. Valve according to claim 1 wherein the terminal windings of the wire are adjacent each other and the windings intermediate said terminal windings are spaced from each other.

4. Valve according to claim 1 wherein the spacer means comprises at least one rod-like element (7) located at a generatrix of the cone, the wire being secured to the rod-like element.

5. Valve according to claim 4 wherein the rod-like elements and the wire are welded to each other at each turn of the wire.

6. Valve according to claim 4 wherein a plurality of rod-like spacer elements are provided, spaced uniformly about the circumference 7. Valve according to claim 1 wherein the wire is wound at the tip of the cone to leave an inner diameter large enough to thread a screw therethrough, the screw thread engaging at least one turn of the spiral formed by the wire;
    said screw being secured to the deformable elastic insert (6) to hold the insert in position.

8. Valve according to claim 1 wherein the deformable insert is formed with an end portion and a projecting head at the end thereof;
    the wire is wound at the tip of the cone to leave an inner diameter large enough to pass the end portion through the end turns of the spiral.

9. Valve according to claim 1 wherein the insert is an elastomer material.

* * * * *